(12) United States Patent
Duraisamy et al.

(10) Patent No.: US 12,488,693 B2
(45) Date of Patent: Dec. 2, 2025

(54) METHOD TO REGENERATE ON BOARD WEATHER RADAR DISPLAY AT THE GROUND

(71) Applicant: ARINC Incorporated, Annapolis, MD (US)

(72) Inventors: Krishnamoorthy Duraisamy, Bangalore (IN); Jacob G. Teague, West Melbourne, FL (US); Sathiyaseelan Thulasidass, Bangalore (IN); Umanath Govindaraju, Tamilnadu (IN); Balraj Gangadhar, Bangalore (IN)

(73) Assignee: ARINC Incorporated, Annapolis, MD (US)

( * ) Notice: Subject to any disclaimer, the term of this patent is extended or adjusted under 35 U.S.C. 154(b) by 396 days.

(21) Appl. No.: 18/122,374

(22) Filed: Mar. 16, 2023

(65) Prior Publication Data
US 2024/0161631 A1    May 16, 2024

(30) Foreign Application Priority Data
Nov. 16, 2022    (IN) .............................. 202211065739

(51) Int. Cl.
*G08G 5/21*     (2025.01)
*G01S 7/00*     (2006.01)
(Continued)

(52) U.S. Cl.
CPC ................ *G08G 5/21* (2025.01); *G01S 7/003* (2013.01); *G01S 13/953* (2013.01); *G08G 5/26* (2025.01); *G08G 5/76* (2025.01)

(58) Field of Classification Search
CPC ........ G01S 13/87; G01S 13/91; G01S 13/953; G01S 7/003; G01S 7/043; G01S 7/066;
(Continued)

(56) References Cited

U.S. PATENT DOCUMENTS 6,014,606 A    1/2000   Tu
7,633,428 B1   12/2009  McCusker et al.
(Continued)

OTHER PUBLICATIONS

Extended European Search Report dated Mar. 28, 2024; European Application No. 23210040.4.

*Primary Examiner* — Timothy X Pham
(74) *Attorney, Agent, or Firm* — Suiter Swantz IP

(57) ABSTRACT

A ground station is used by an air traffic controller to provide support to an aircraft. In particular, the ground station may mirror or regenerate a weather radar overlay of a flight display of the aircraft. The air traffic controller and the flight crew may then both see the same real-time weather information with minimum delay and achieve a similar level of situation awareness. The weather radar overlay may be displayed on a display of the ground station. The ground station may receive weather data and ADS-B data or other forms of location data and intended flight path from the aircraft via an air-to-ground communication channel. The weather data may be used to regenerate the weather radar overlay. The ground station may also use the ADS-B data to generate a coverage map of the aircraft in a selected airspace.

18 Claims, 12 Drawing Sheets

(51) Int. Cl.
*G01S 13/95* (2006.01)
*G08G 5/26* (2025.01)
*G08G 5/76* (2025.01)

(58) Field of Classification Search
CPC ... G01S 7/18; G08G 5/21; G08G 5/22; G08G 5/26; G08G 5/76
See application file for complete search history.

(56) References Cited

U.S. PATENT DOCUMENTS

| | | |
|---|---|---|
| 9,223,020 B1 | 12/2015 | Crosmer et al. |
| 9,411,044 B1 | 8/2016 | Sperling et al. |
| 9,594,162 B1* | 3/2017 | Sonera ................. G01S 13/953 |
| 9,691,288 B2 | 6/2017 | Agrawal |
| 10,175,353 B2 | 1/2019 | Kronfeld et al. |
| 10,605,912 B1 | 3/2020 | Godfrey et al. |
| 2015/0304813 A1* | 10/2015 | Esposito ................. G01S 7/003 |
| | | 455/456.2 |
| 2016/0057032 A1 | 2/2016 | Tieftrunk et al. |
| 2016/0266249 A1 | 9/2016 | Kauffman et al. |
| 2017/0094590 A1 | 3/2017 | Wang et al. |
| 2020/0408905 A1* | 12/2020 | Dubois ................... G01S 13/91 |
| 2021/0383708 A1* | 12/2021 | Gibbons ................. G08G 5/53 |
| 2022/0139235 A1 | 5/2022 | Teague |

* cited by examiner

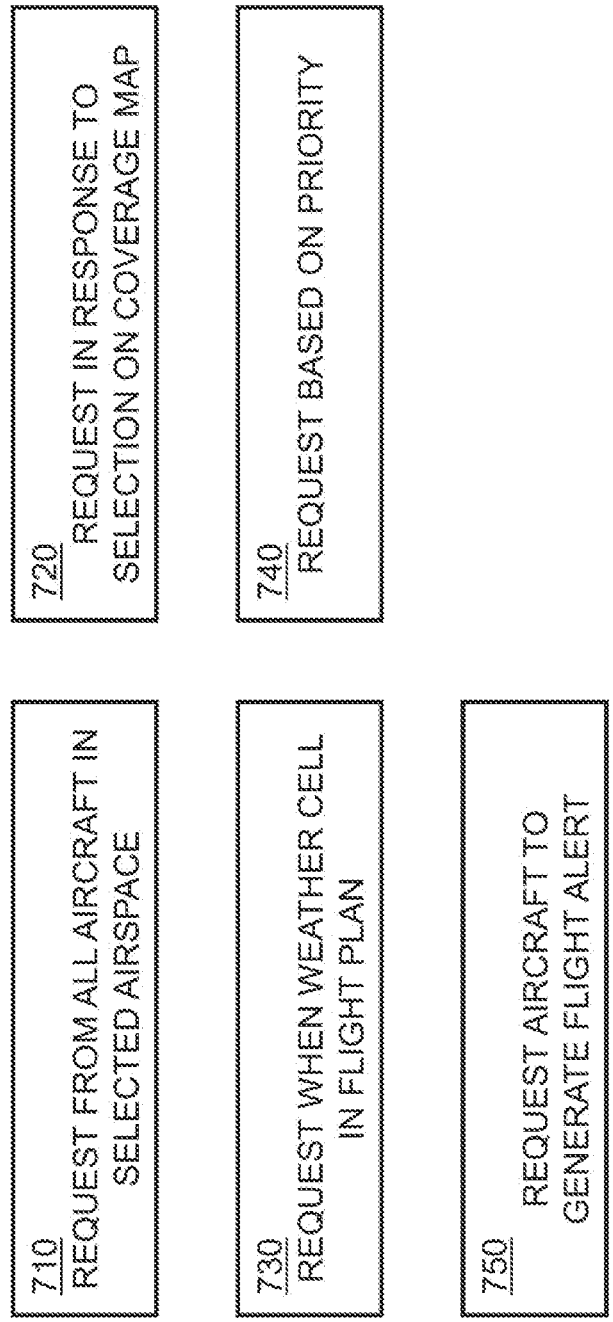

METHOD TO REGENERATE ON BOARD WEATHER RADAR DISPLAY AT THE GROUND

CROSS-REFERENCE TO RELATED APPLICATIONS

The present application claims the benefit of India Provisional Patent Application 202211065739, filed Nov. 16, 2022, titled "METHOD TO REGENERATE ON BOARD WEATHER RADAR DISPLAY AT THE GROUND", naming Krishnamoorthy Duraisamy et al. as inventors, with a Digital Access Service (DAS) code of B8A6, which is incorporated herein by reference in the entirety.

TECHNICAL FIELD

The present invention generally relates to traffic control systems for aircraft, and more specifically to traffic control systems using weather information.

BACKGROUND

Ground stations may receive a variety of weather data including pilot reports (PIREPs) and aviation Meteorological reports (e.g., AIRMET, SIGMET, METAR, NEXRAD). Pilot Reports (PIREPs) provide valuable information regarding the conditions as they exist in the air, which cannot be gathered from any other source. Pilots can verbally confirm the height of bases and tops of clouds, locations of windshear and turbulence, and the location of inflight icing. Airman's Meteorological Information (AIRMET) advises of weather that maybe hazardous, other than convective activity, to single engine, other light aircraft, and Visual Flight Rule (VFR) pilots. AIRMETs are routinely issued for 6-hour periods by National Weather Service's Aviation Weather Center. Significant Meteorological Information (SIGMET) advises of weather, other than convective activity, that is potentially hazardous to all aircraft. SIGMETs are issued for 6-hour periods for conditions associated with hurricanes and 4 hours for all other events. Meteorological Aerodrome Report (METAR) Aviation routine weather report: Contains data for the temperature, dew point, wind speed & direction, precipitation, cloud cover & heights, visibility, and barometric pressure. Reports are typically generated once an hour. Next Generation Weather Radar (NEXRAD) systems are Doppler weather radars that detect and produce over 100 different long-range and high-altitude weather observations and products, including areas of precipitation, winds, and thunderstorms.

An air traffic controller (ATC) at the ground station may be called on by a flight crew of the aircraft to provide assistance, such as to adjust a flight path of the aircraft due to hazardous weather conditions. The ATC must become familiar with pertinent weather information in order to assist the flight crew. The ATC may use the weather data provided by PIREP, AIRMET, SIGMET, METAR, and NEXRAD when issuing instructions to the aircraft. The instructions may cause the aircraft to adjust a flight path causing the aircraft to avoid the hazardous weather conditions.

The weather data provided by AIRMET, SIGMET, METAR, and NEXRAD may not indicate the real-time weather data around the aircraft. The lack of the overall situation awareness (SA) pertaining to real-time weather conditions around the aircraft may cause the ATC at the ground station to request the flight crew to provide PIREPs. The PIREPs may increase the workload of the ATC and the flight crew. For example, the ATC may request the flight crew to describe the weather conditions displayed on a weather display of the aircraft. The flight crew must then describe the weather condition while also performing a number of other responsibilities. The ATC at the ground station must then receive and decipher the PIREPs from the flight crew while also performing a number of other responsibilities. Additionally, the PIREPs provided by the flight crew to the ground station may be inaccurate or incomplete regarding the weather conditions around the aircraft.

Providing the weather updates by voice communication may require additional workload for the flight crew and/or may result in decisions by the ATC based on inaccurate weather reports. Therefore, it would be advantageous to provide a device, system, and method that addresses the shortcomings described above.

SUMMARY

A ground station is disclosed in accordance with one or more embodiments of the present disclosure. In some embodiments, the ground station includes a communication system configured to receive weather data and traffic data from an aircraft. In some embodiments, the aircraft comprises a flight display and a radar system. In some embodiments, the radar system is configured to generate the weather data. In some embodiments, the flight display is configured to generate a weather radar overlay based on the weather data. In some embodiments, the ground station includes a display. In some embodiments, the ground station includes a memory maintaining program instructions. In some embodiments, the ground station includes one or more processors configured to execute the program instructions. In some embodiments, the program instructions cause the one or more processors to receive the weather data and the traffic data. In some embodiments, the program instructions cause the one or more processors to cause the display to generate a graphical overlay based on the weather data. In some embodiments, the graphical overlay mirrors the weather radar overlay of the flight display in real-time. In some embodiments, the graphical overlay comprises a representation of the aircraft in a fixed position, a plurality of radials projecting away from the representation of the aircraft, and a representation of one or more weather cells. In some embodiments, a position of the representation of the one or more weather cells relative to the representation of the aircraft indicates a position of the one or more weather cells relative to the aircraft.

A system is disclosed in accordance with one or more embodiments of the present disclosure. In some embodiments, the system includes an aircraft. In some embodiments, the aircraft includes a radar system. In some embodiments, the radar system is configured to generate weather data. In some embodiments, the aircraft includes a flight display. In some embodiments, the flight display is configured to generate a weather radar overlay based on the weather data. In some embodiments, the system includes a ground station. In some embodiments, the ground station includes a communication system configured to receive the weather data and traffic data from the aircraft. In some embodiments, the ground station includes a display. In some embodiments, the ground station includes a memory maintaining program instructions. In some embodiments, the ground station includes one or more processors configured to execute the program instructions. In some embodiments, the program instructions cause the one or more processors to receive the weather data and traffic data. In some embodiments, the program instructions cause the one or more processors to cause the display to generate a graphical overlay based on the weather data. In some embodiments, the graphical overlay mirrors the weather radar overlay of the flight display in real-time. In some embodiments, the graphical overlay comprises a representation of the aircraft in a fixed position, a plurality of radials projecting away from the representation of the aircraft, and a representation of one or more weather cells. In some embodiments, a position of the representation of the one or more weather cells relative to the representation of the aircraft indicates a position of the one or more weather cells relative to the aircraft.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7 depicts a request module of a ground station, in accordance with one or more embodiments of the present disclosure.

DETAILED DESCRIPTION OF THE INVENTION

Figure 1A:
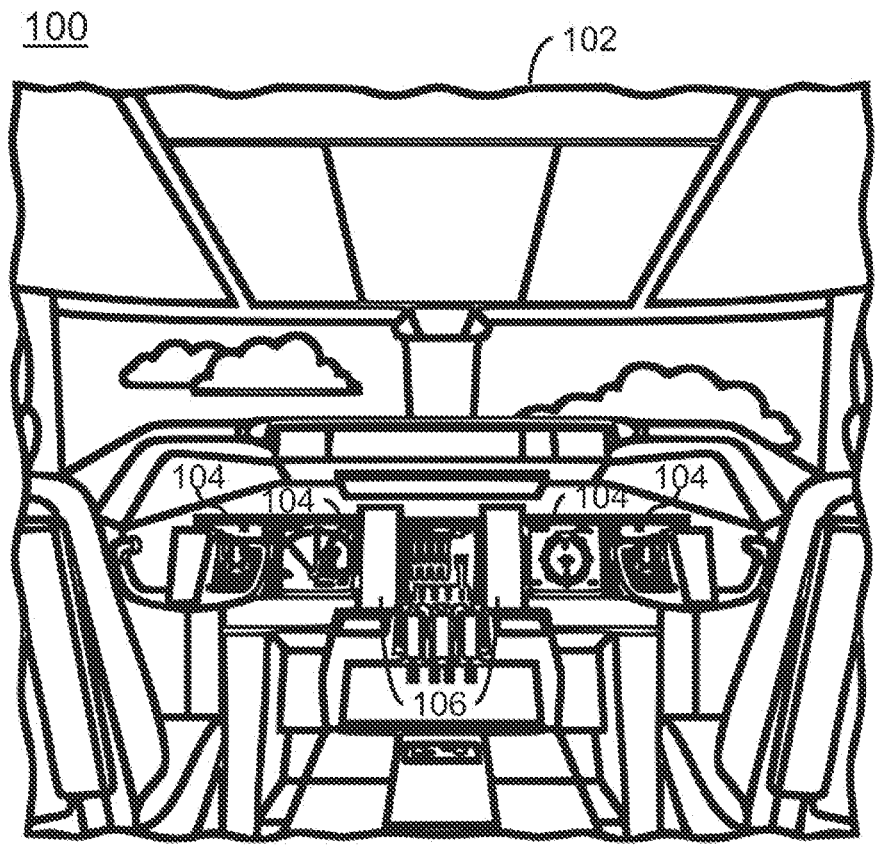
FIG. 1A depicts an aircraft cockpit, in accordance with one or more embodiments of the present disclosure.

Before explaining one or more embodiments of the disclosure in detail, it is to be understood that the embodiments are not limited in their application to the details of construction and the arrangement of the components or steps or methodologies set forth description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings.

Embodiments of the present disclosure are directed to providing a solution to reduce the workload of an air traffic controller (ATC) at a ground station and flight crew (e.g., pilot) of an aircraft. Aircraft may be equipped with a radar which is on-board the aircraft. The radar may capture real-time weather data. The real-time weather data captured by the radar may be shared with the ground station. The ground station may then use the real-time weather data for a weather display. The ground station may display the real-time weather data on a coverage map or a specific airspace surrounding the aircraft. As used herein, the term real-time may refer to a near real-time of within ten seconds of actual conditions. The real-time weather data include minor delays due to a time between received returns, aircraft processing, propagation time of an air-to-ground communication channel, and ground station processing. In embodiments, the ground station may regenerate the weather display of the aircraft at the ground station using the real-time weather data together with aircraft parameters received from the aircraft. Regenerating the weather display at the ground station may refer to duplicating or mirroring the weather display of the aircraft on the ground. The ground station may then use the weather display to view exactly the same weather conditions as the flight crew. The ability of the ground station to view exactly the same weather conditions as the flight crew may provide the ground station with situational awareness about weather conditions in the flight path of the aircraft. In particular, the flight crew and the ground station may receive the same information without the flight crew having to describe the weather conditions via PIREP.

U.S. Pat. No. 10,175,353, titled "Enhancement of airborne weather radar performance using external weather data", is incorporated herein by reference in the entirety.

Referring to FIG. 1A, a schematic illustration of an aircraft control center or cockpit 102 is shown according to an exemplary embodiment of the inventive concepts disclosed herein. The cockpit 102 may include one or more flight displays 104 and one or more user interface ("UI") elements 106. The flight displays 104 may be implemented using any of a variety of display technologies, including CRT, LCD, organic LED, dot matrix display, and others. The flight displays 104 may be navigation (NAV) displays, primary flight displays, electronic flight bag displays, tablets, synthetic vision system displays, head up displays (HUDs) with or without a projector, and the like. The flight displays 104 may be used to provide information to the flight crew, thereby increasing visual range and enhancing decision-making abilities. One or more of the flight displays 104 may be configured to function as, for example, a primary flight display (PFD) used to display altitude, airspeed, vertical speed, and navigation and traffic collision avoidance system (TCAS) advisories. One or more of the flight displays 104 may also be configured to function as, for example, a multi-function display used to display navigation maps, weather radar, electronic charts, TCAS traffic, aircraft maintenance data and electronic checklists, manuals, and procedures. One or more of the flight displays 104 may also be configured to function as, for example, an engine indicating and crew-alerting system (EICAS) display used to display critical engine and system status data. Other types and functions of the flight displays 104 are contemplated as well. According to various exemplary embodiments of the inventive concepts disclosed herein, at least one of the flight displays 104 may be configured to provide a rendered display from the systems and methods of the present disclosure.

In some embodiments, the flight displays 104 may provide an output based on data received from a system external to an aircraft, such as a ground-based weather radar system, satellite-based system, or from a system of another aircraft. In some embodiments, the flight displays 104 may provide an output from an onboard aircraft-based radar system, LIDAR system, infrared system or other system on an aircraft. For example, the flight displays 104 may include a weather display, a weather radar map, and a terrain display. In some embodiments, the flight displays 104 may provide an output based on a combination of data received from multiple external systems or from at least one external system and an onboard aircraft-based system. The flight displays 104 may include an electronic display or a synthetic vision system (SVS). For example, the flight displays 104 may include a display configured to display a two-dimensional (2-D) image, a three-dimensional (3-D) perspective image of terrain and/or weather information, or a four-dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 106 may include, for example, dials, switches, buttons, touch screens, keyboards, a mouse, joysticks, cursor control devices (CCDs) or other multi-function key pads certified for use with avionics systems. The UI elements 106 may be configured to, for example, allow an aircraft crew member to interact with various avionics applications and perform functions such as data entry, manipulation of navigation maps, and moving among and selecting checklist items. For example, the UI elements 106 may be used to adjust features of the flight displays 104, such as contrast, brightness, width, and length. The UI elements 106 may also (or alternatively) be used by an aircraft crew member to interface with or manipulate the displays of the flight displays 104. For example, the UI elements 106 may be used by aircraft crew member to adjust the brightness, contrast, and information displayed on the flight displays 104. The UI elements 106 may additionally be used to acknowledge or dismiss an indicator provided by the flight displays 104. The UI elements 106 may be used to correct errors on the flight displays 104. Other UI elements 106, such as indicator lights, displays, display elements, and audio alerting devices, may be configured to warn of potentially threatening conditions such as severe weather, terrain, and obstacles, such as potential collisions with other aircraft.

Figure 1B:
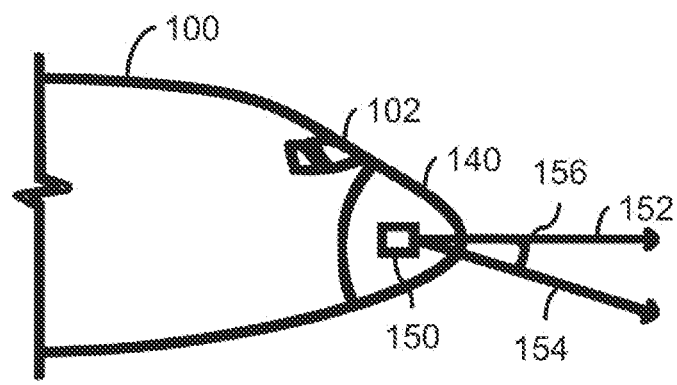
FIG. 1B depicts simplified view of a front of an aircraft including a radar system, in accordance with one or more embodiments of the present disclosure.

Referring to FIG. 1B, a schematic illustration of the front of an aircraft 100 is shown according to an exemplary embodiment of the inventive concepts disclosed herein. The aircraft 100 includes a nose 140, a radar system 150, and the aircraft control center or cockpit 102. The radar system 150 may also be referred to as a weather radar, on-board weather radar, and the like. The radar system 150 is generally located inside the nose 140 of the aircraft 100 or inside the cockpit 102 of the aircraft 100. According to other exemplary embodiments of the inventive concepts disclosed herein, the radar system 150 may be located anywhere on the aircraft 100, such as on the top of the aircraft 100, on the belly of the aircraft 100, on the tail of the aircraft 100, or on either or both sides of the aircraft 100. Various components of the radar system 150 may be distributed at multiple locations throughout the aircraft 100. The radar system 150 may include or be coupled to an antenna system of the aircraft 100. The radar system 150 or other equipment onboard the aircraft 100 may be configured to receive weather data from other sources. For example, the radar system 150 or other equipment aboard the aircraft 100 may receive weather data from ground-based radar systems, satellite-based systems, and from aircraft-based system of other aircraft. The radar system 150 may be any radar system configured to detect or receive data for the systems and methods of the present disclosure. According to exemplary embodiments of the inventive concepts disclosed herein, the radar system 150 may be an RTA-4218 MULTISCAN radar system, a WXR-2100 MULTISCAN radar system, or similar system.

The radar system 150 may be configured to cast one or more radar signals from an aircraft mounted antenna, to receive returns, receive echoes, and/or receive radio frequency (RF) signals. The radar system 150 may also be configured to interpret the received echoes (e.g., for display to a user by the flight displays 104, for transmission to an external weather system).

The radar system 150 may generally operate by sweeping a radar beam horizontally back and forth. For example, the radar system 150 may conduct a first horizontal sweep 152 directly in front of the aircraft 100 and a second horizontal sweep 154 downward at a tilt angle 156 (e.g., 20 degrees downward). Received echoes from different tilt angles may be electronically merged to form a composite image for display on an electronic display, such as the flight displays 104 in the cockpit 102. Received echoes may also be processed to, for example, distinguish among terrain, weather, and other objects, to determine the height of the terrain, and to determine the height of the weather.

The radar system 150 may also sweep a radar beam vertically back and forth across the sky. In some embodiments, the radar system 150 may sweep a radar beam vertically back and forth at varying vertical tilt angles. Results from the different vertical tilt angles may be analyzed to determine the characteristics of weather. For example, the altitude, range, and vertical height of weather conditions may be determined using the vertical scan results. The vertical scan results may be used to form an image for display on an electronic display. For example, a vertical profile view of the weather may be generated and provided to flight crew on the flight display 104 of the cockpit 102. The profile may be used by a flight crew to determine height, range, hazards and threats, and other relevant information that may be utilized by an aircraft crew member to evaluate a current course or to change the course of the aircraft to avoid the detected weather condition. The profile may also be used by an autonomous system which determines the height, range, hazards and threats, and other relevant information. The autonomous system may include one or more functions, such as, but not limited to, image processing to determine the height, range, hazards and threats, and other relevant information. The image processing may include an image processing model trained using machine learning or a similar approach.

In embodiments, the radar system 150 may generate weather data (e.g., weather data 312) based on the received echoes or received radio frequency (RF) signal. The weather data may include, but is not limited to, ARINC 708 data. The ARINC 708 data may include, but is not limited to ARINC 708A data. The ARINC 708A data may include, but is not limited to, Display Mode, Gain, Tilt, Scan angle, Range, weather conditions, and/or weather alerts. The weather data may include Range Bin data (e.g., reflectivity value in terms of color coding), weather alerts (e.g., Windshear Alert, Turbulence Alert, etc.), and the like. The weather data may also be indicative of one or more types of weather conditions. For example, the weather data may be indicative of weather cells, convective weather systems (e.g., thunderstorms), turbulence, winds aloft, icing, hail, or volcanic ash. Individual weather cells may be, for example, 3-D regions of significant reflectivity or other values above one or more specified threshold values. Individual weather cells may be composed of reflectivity radial run segments, and in turn, 2-D weather components composed of segment groups and occurring at different radar elevation angles. Such weather cell data may also include individual data points and trends for each weather cell. For example, current weather cell location may be provided with azimuth, range, direction, and speed information, such as a motion vector using polar and/or Cartesian coordinates along with an estimate of any tracking errors. Other information may be included such as, for example, storm base height, storm top height, maximum reflectivity, height of maximum reflectivity, probability of hail, probability of severe hail, cell-based vertically integrated liquid (VIL) content, enhanced echo tops (EET) and centroid height, among other information types.

In embodiments, the flight display 104 may generate a graphical overlay based on the weather data from the radar system 150.

Figure 2A:
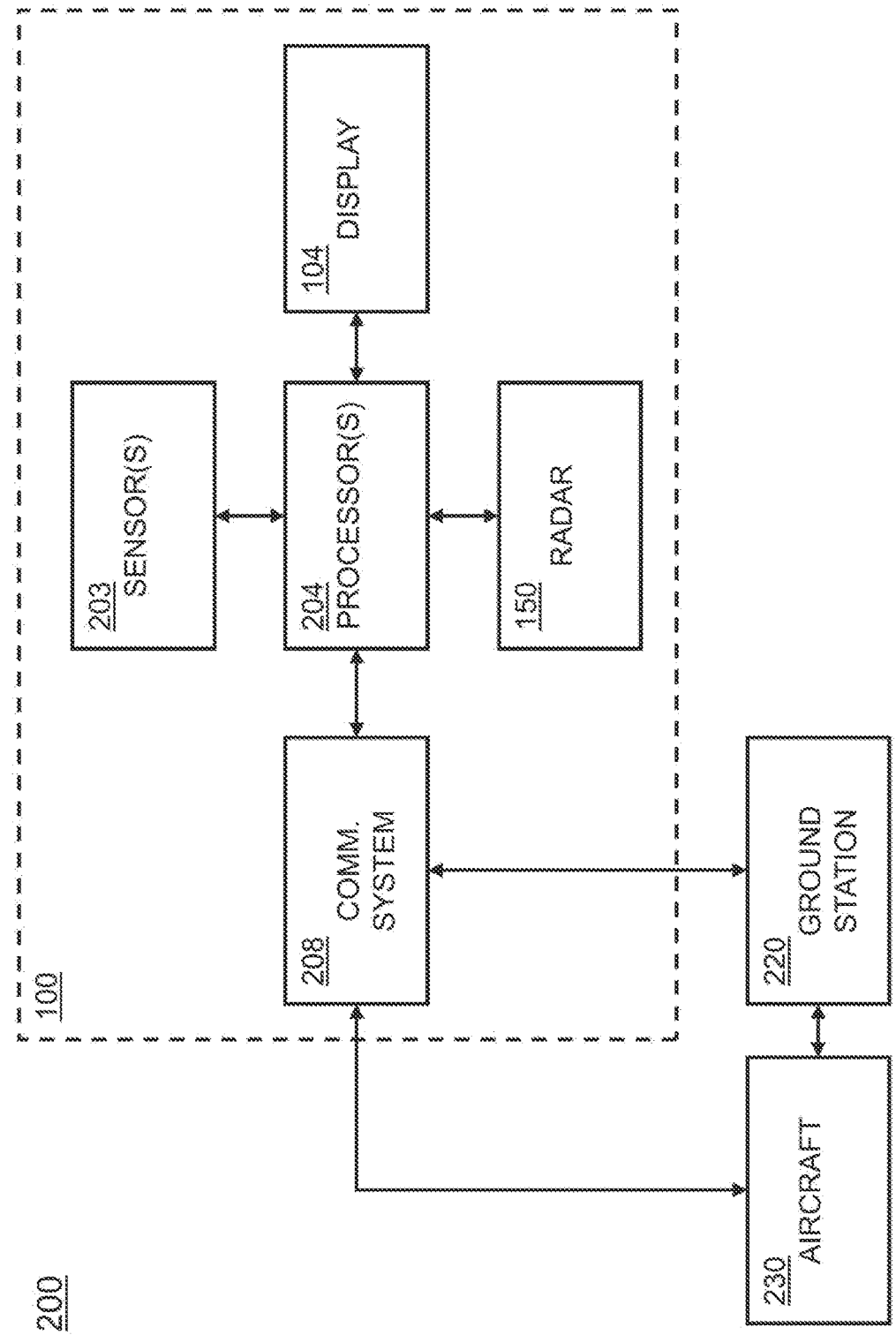
FIGS. 2A-2B depict a simplified block diagram of a system, in accordance with one or more embodiments of the present disclosure.
Figure 2B:
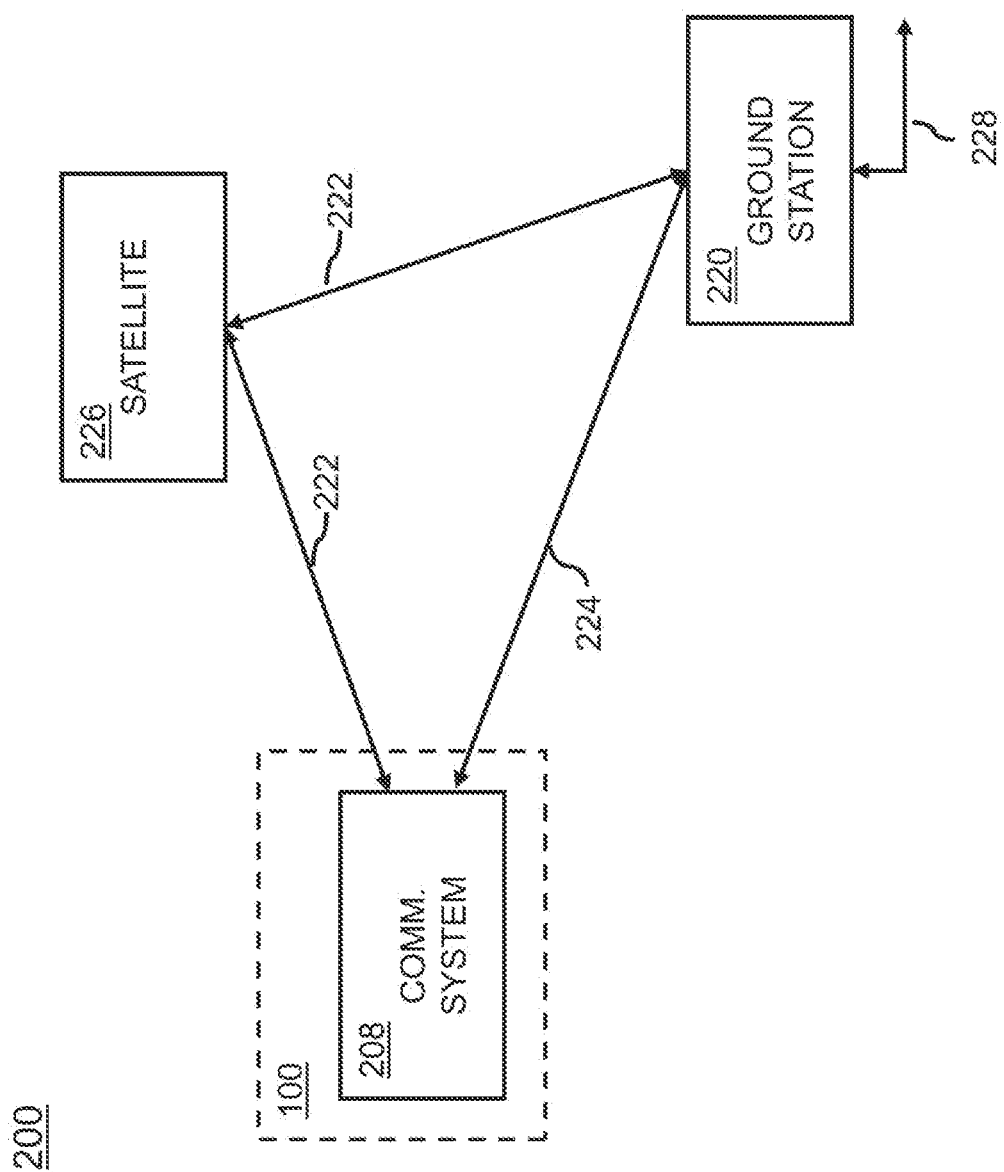

Referring to FIGS. 2A-2B, a block diagram of a system 200 is shown according to an exemplary embodiment of the inventive concepts disclosed herein. The system 200 includes the aircraft 100, a ground station 220, one or more other aircraft 230, a satellite 226, and the like. As depicted, the aircraft 100 may include the flight displays 104, the radar system 150, aircraft sensors 203, processors 204, a communication system 208, and the like.

The aircraft sensors 203 may include, for example, one or more airspeed sensors, location tracking sensors (e.g., GPS), lightning sensors, turbulence sensors, pressure sensors, optical systems (e.g., camera system, infrared system), outside air temperature sensors, winds at altitude sensors, INS G load (in-situ turbulence) sensors, barometric pressure sensors, humidity sensors, fuel sensors, or any other aircraft sensors or sensing systems that may be used to monitor the performance of an aircraft or weather local to or remote from the aircraft. Data from the aircraft sensors 203 may be output to the processors 204 for further processing and display, for input to the radar system 150, or for transmission to a station (e.g., a ground-based radar system or terrestrial station such as the terrestrial station 220, air traffic control services system, or other terrestrial station), satellite, or to the aircraft 230 via the communication system 208. Data collected from external systems (e.g., the terrestrial station 220) may also be processed by the processors 204 to configure the collected data for display and to provide the data to the radar system 150 to be processed and used to control aspects of the radar system 150.

In embodiments, the aircraft sensors 203 may generate traffic data (e.g., traffic data 314). The traffic data may be generated in any suitable format, such as, but not limited to, Automatic Dependent Surveillance Broadcast (ADS-B) data, Aircraft Situation Display to Industry (ASDI), global navigation satellite system (GNSS) (e.g., global positioning system (GPS)), data related to aircraft position, data related to flight path, flight path management data, registration data, and the like. Much of the present disclosure describes the traffic data in the context of the ADS-B data, although this is not intended to be limiting. The ADS-B data may include, but is not limited to, aircraft identification and category messages, airborne position messages, airborne velocity messages, surface position messages, airspeed, longitude, latitude, altitude, time of observation, and the like. The ADS-B data may be used by the aircraft 100 for various purposes. The ADS-B data may also be provided to the processors 204 for further processing and analysis, for use in automated functions, or for transmission to an external system (e.g., the terrestrial station 220, a satellite system, the other aircraft 230) via the communication system 208.

The radar system 150 may be a system for detecting weather patterns. Detected weather patterns may be communicated to the flight display 104 for display to the flight crew. Detected weather patterns may be provided to the processors 204 for further processing and analysis, for use in automated functions, or for transmission to an external system (e.g., the terrestrial station 220, a satellite system, the other aircraft 230) via the communication system 208.

The communication system 208 may be configured to communicate with external systems, such as the ground station 220, satellite 226, and/or the aircraft 230. In embodiments, the weather data and/or the traffic data may be transmitted to the terrestrial station 220 or the aircraft 230 from the communication system 208 via an air-to-ground communication channel. The processors 204 may receive the weather data from the radar system 150. The weather data may be in the form of ARINC 708 data. The processors 204 may also receive traffic data from the aircraft sensors 203. The processors 204 may convert the weather data and the traffic data into a format suitable for transmission to the ground station 220 from the communication system 208.

The processors 204 cause the communication system 208 to transmit the weather data and the traffic data to the ground station 220 over the air-to-ground communication channel using a transport layer protocol. The transport layer protocol may include, but is not limited to, User Datagram Protocol (UDP), Transmission Control Protocol (TCP), Stream Control Transmission Protocol (SCTP)), and the like. In embodiments, the transport layer protocol is UDP. The communication system 208 may then transmit the weather data and/or the traffic data may be transmitted to the terrestrial station 220 or the aircraft 230.

Referring to FIG. 2B, the aircraft 100 may communicate with the ground station 220 using an air-to-ground communication channel. The air-to-ground communication channel may include, but is not limited to, a satellite communication (SATCOM) link 222, a very-high frequency (VHF) link 224, a high-frequency link (not depicted), and the like. For example, the system 200 may include the satellite 226. The communication system 208 of the aircraft 100 may uplink the weather data and/or the traffic data to the satellite 226 by the SATCOM link 222. The satellite 226 may then downlink the weather data and/or the traffic data to the ground station 220 (e.g., to a communication system of the ground station 220). By way of another example, the communication system 208 of the aircraft 100 may communicate the weather data and/or the traffic data to the ground station 220 (e.g., to a communication system of the ground station 220) by the VHF link 224. The VHF link 224 may also be considered a line-of-sight link. The ground station 220 may also receive the weather data and/or the traffic data from the aircraft 100 via a wired link 228 (e.g., from one or more ground based communication systems). The ground station 220 may also receive the weather data and/or the traffic data from the aircraft 100 via a high frequency (HF) link. The HF link may be considered a beyond-line of sight link which may reflect from the ionosphere.

Figure 3:
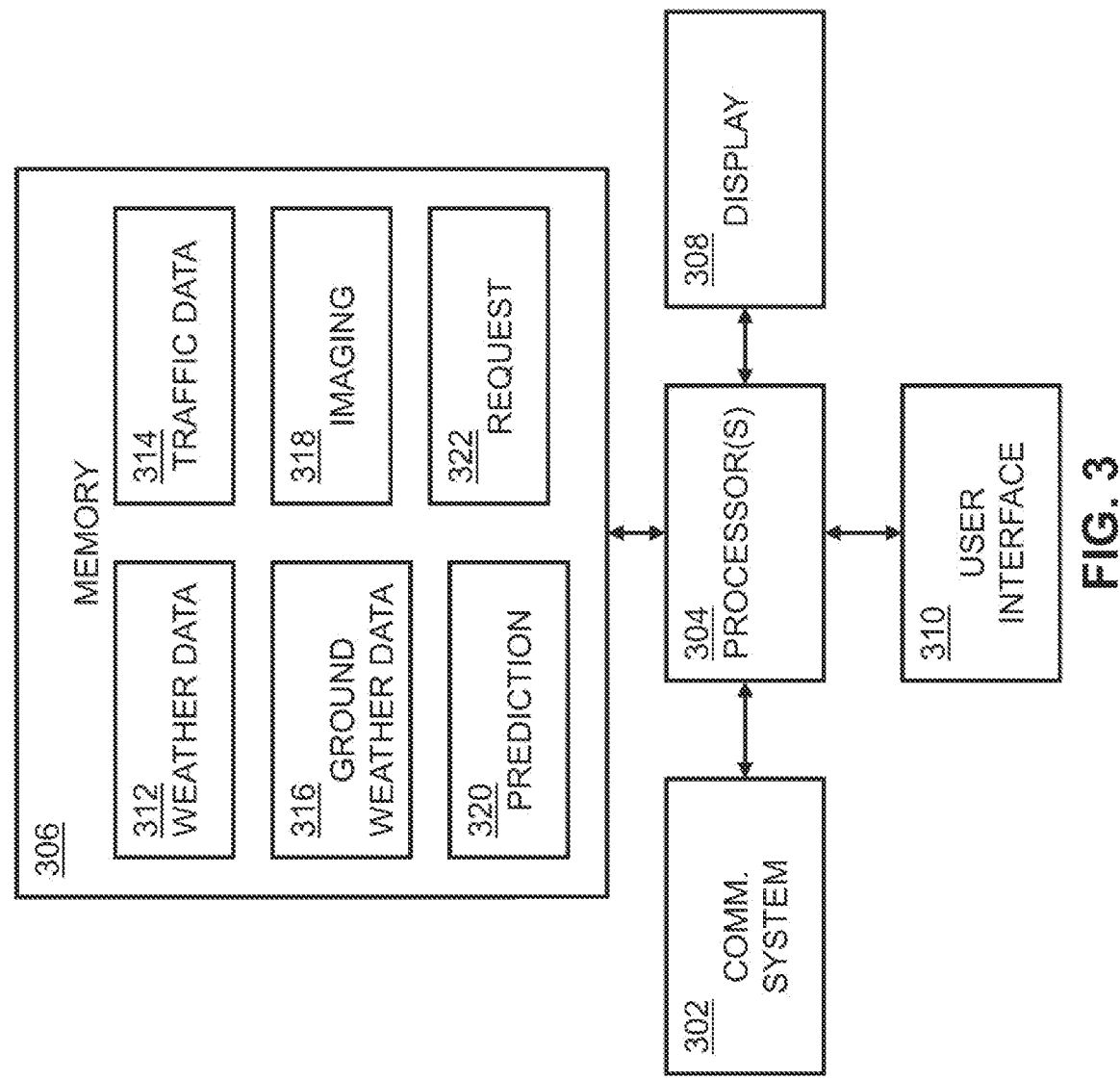
FIG. 3 depict a simplified block diagram of a ground station, in accordance with one or more embodiments of the present disclosure.

Referring now to FIG. 3, the ground station 220 is described, in accordance with one or more embodiments of the present disclosure. The ground station 220 may include, but is not limited to, a communication system 302, processors 304, memory 306, display 308, and the like.

The communication system 302 of the ground station 220 may receive the weather data 312 and/or the traffic data 314 from the aircraft 100 via the air-to-ground communication channel (e.g., the SATCOM link, the VHF link, the HF link, etc.). The data received by the ground station may be in packets. The ground station 220 may process the received packets and reconstruct the weather data 312 and/or the traffic data 314 from the packets using the transport layer protocol. The ground station 220 may also identify the packets are from the aircraft 100. The weather data 312 and/or the traffic data 314 may then be stored in memory 306. The communication system 302 may include any suitable communication system for receiving the data from an air-to-ground communication channel. For example, the communication system 302 may include, but is not limited to, a SATCOM terminal, a VHF terminal, an HF terminal, and the like.

The weather data 312 and the traffic data 314 may be received at an interval. The interval may refer to an interval at which the air-to-ground communication channel is used to transmit the weather data 312 and/or the traffic data 314 from the aircraft 100 to the ground station 220. In embodiments, the interval may be based on the interval in which the weather display 104 may generate a weather radar overlay based on the weather data 312. For example, the weather display 104 may generate a weather radar overlay with multiple radials, such as, but not limited to, 720 of the range bins. Each of the range bins may be generated at frequency, such as, but not limited to, 180 hertz. For this example, new images may be generated every 4 seconds. The interval at which the weather data 312 and/or the traffic data 314 is received may be based on the time to generate the image. In this example, the interval at which ground station 220 receives the weather data 312 and/or the traffic data 314 is every 4 seconds, although this is not intended to be limiting. Receiving the weather data 312 and/or the traffic data 314 every four seconds would then provide the ground station 220 with real-time information from the aircraft 100. It is contemplated the interval may be adjusted based on the number of the radials and the frequency at which the radials are generated. The interval may also be adjusted based on one or more control settings of the radar system 150, such as, but not limited to, range, gain, mode, scan angle, tilt, and the like. For example, the interval may be between 1 and 10 seconds. The interval may contribute to a minor delay in the real-time weather data. The real-time weather data may also include minor delays due to a processing time of the aircraft 100, a propagation time of the air-to-ground communication channel, and a processing time of the ground station 220. In this regard, the term "real-time" or real-time weather data may refer to every ten seconds or less.

In embodiments, the weather data 312 may include ARINC 708A data. In embodiments, the weather data 312 includes a reflectivity value for range bins. In embodiments, the weather data 312 includes at least one of a range setting, a gain setting, a scan angle setting, or a tilt setting for the radar system 150.

The ground station 220 may also receive sources of ground weather data 316 by the communication system 302. The ground weather data 316 may include, but is not limited to, weather data from AIRMET, SIGMET, METAR, NEXRAD, and the like. The 00 ground weather data 316 may then be stored in memory 306.

The memory 306 may include the weather data 312, the traffic data 314, the ground weather data 316, the weather imaging module 318, prediction module 320, request module 322, and the like.

In embodiments, the processors 304 may identify one or more weather cells disposed in a flight path of the aircraft 100 based on the weather data 312. For example, the weather cells may be detected from range bin data which include the reflectivity of weather cells in an airspace.

The traffic data 314 may generally indicate a flight plan for the aircraft 100, a destination of the aircraft 100, and any other information relating to the operation of the aircraft 100. The traffic data 314 may also be used to track the aircraft 100 along a flight path. Commonly, the flight path is aligned with the flight plan. The traffic data 314 may be received from the aircraft 100 by way of the communication system 302. The traffic data 314 may be used by the ground station 220 to identify the aircraft information of each packet received by the ground station 220. In embodiments, the traffic data 314 is based on ADS-B data, although this is not intended to be limiting. In this regard, the traffic data 314 may also be referred to as ADS-B data.

The memory 306 may include a weather imaging module 318. The weather imaging module 318 may generally be configured to utilize the weather data 312, the traffic data 314, and/or the ground weather data 316 to provide individual, composite, fused, or overlay image data indicative of a weather condition for display on display 308, as will be described further herein. In embodiments, the program instructions may cause the processors 304 to cause the display 308 to generate one or more graphical overlays (e.g., graphical overlay 400), coverage maps (e.g., coverage map 500), and the like. The graphical overlays, coverage maps, and the like may be generated based on one or more of the weather data 312, the traffic data 314, and/or the ground weather data 316. The term generate or generating may refer to generating an image on a display.

The memory 306 may include a prediction module 320. The prediction module 320 may include one or more algorithms which are executable by the processors 304. The prediction module 320 may cause the processors 304 to identify aircraft which near hazardous weather conditions (e.g., aircraft which may require attention in the near term). The prediction module 320 is further described herein.

The memory may include a request module 322. The request module 322 may cause the processors 304 to cause the communication system 302 to request the weather data 312 from the aircraft 100. The processors 304 may cause the communication system 302 to request the weather data 312 from the aircraft 100 in response to one or more conditions, such as, but not limited to, based on the priority information, upon receiving a selection of the aircraft 100 by the user interface 310, when the aircraft 100 is within a selected airspace 501 and the like. The request module 322 is further described herein.

Figure 4:
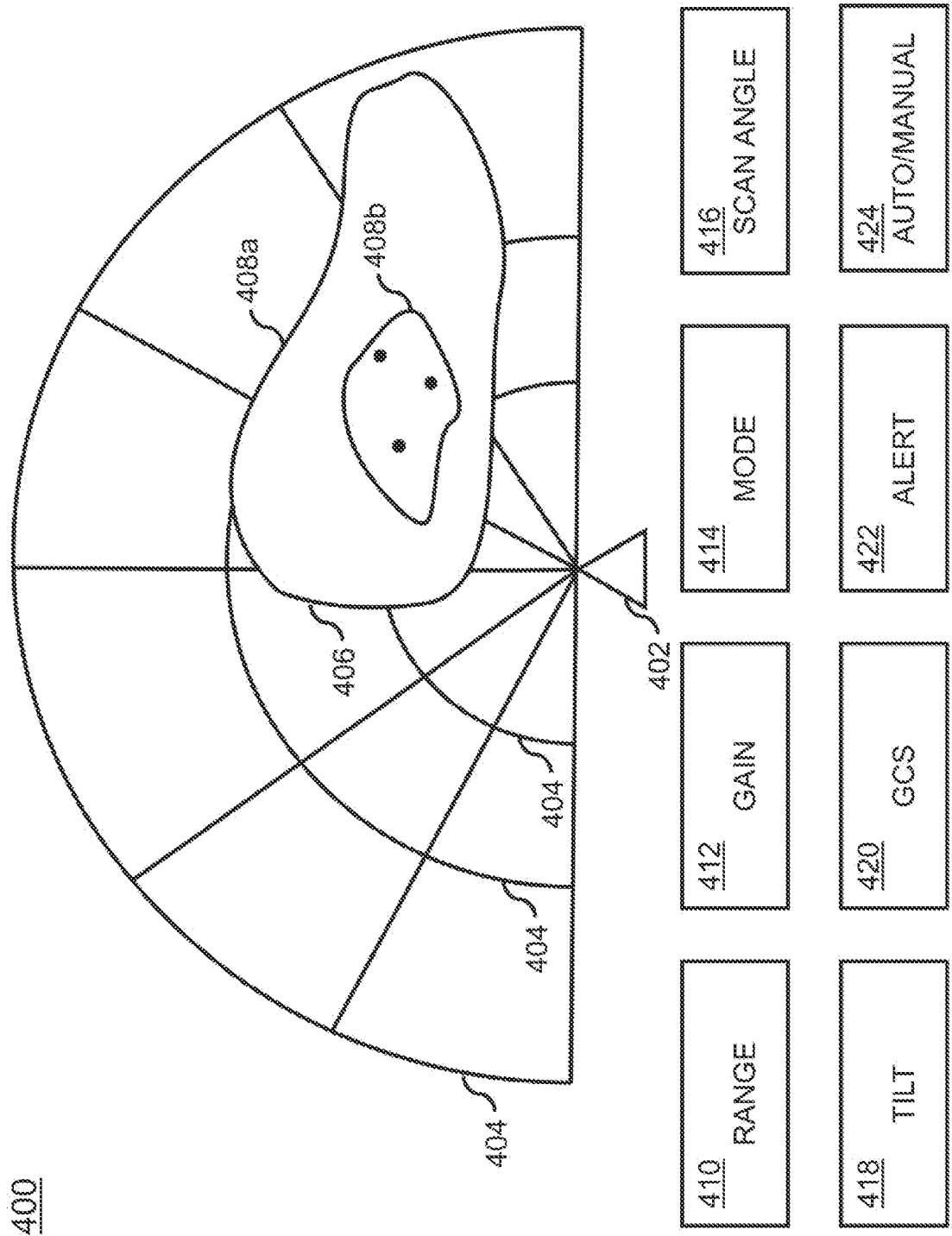
FIG. 4 depicts a graphical overlay, in accordance with one or more embodiments of the present disclosure.

Referring now to FIG. 4, a graphical overlay 400 of the display 308 is depicted, in accordance with one or more embodiments of the present disclosure. In embodiments, the display 308 of the ground station 220 may generate the graphical overlay 400. The graphical overlay 400 may be generated from the weather data 312 received from the aircraft 100. For example, the weather data 312 may be ARINC 708A data. The ARINC 708A data may be processed to generate the graphical overlay 400. The graphical overlay 400 may also be updated in real-time as the weather data 312 is received from the aircraft 100. In this regard, the graphical overlay 400 may be considered a real-time display of the weather data. In embodiments, the graphical overlay 400 may be considered a regenerated image of the weather display 104 which is on-board the aircraft 100. Generating the graphical overlay 400 may also be referred to as regenerating the weather radar overlay of the flight display 104. For example, the weather display 104 may generate a weather radar overlay based on the weather data 312. The graphical overlay 400 on the display 308 of the ground station 220 may mirror the weather radar overlay on the flight display 104 of the aircraft 100. As used herein, mirroring may refer to duplicating or otherwise causing the same image to be displayed across multiple displays. Notably, the display 308 and the display 104 are not collocated. The ability to mirror the weather radar overlay on the display 308 of the ground station 220 may be advantageous to allow the air traffic controller (ATC) at the ground station 220 to see the same weather conditions as the flight crew in the aircraft 100. The ATC may then achieve a similar level of situation awareness (SA) as the flight crew without having to request PIREPs from the flight crew of the aircraft 100. The flight crew may then focus on high priority tasks rather preparing PIREPs during unexpected weather conditions.

The graphical overlay 400 may include a representation 402 of the aircraft 100, radials 404, a representation 406 of weather cells, and the like. The representation 402 may be maintained in a fixed position on the graphical overlay 400. For example, the representation 402 may be fixed position at a bottom center of the graphical overlay 400. The aircraft 100 may be considered a fixed inertial reference frame with relative motion of the aircraft 100 to earth causing the graphical overlay to maintain the representation 402 in the fixed position. In the example depicted, the representation 402 is triangular, although this is not intended to be limiting.

The graphical overlay 400 may also include the radials 404. The radials 404 may project away from the representation 402 of the aircraft 100. For example, the radials 404 may project away from the representation 402 in concentric arcs. The radials 404 are concentric about the representation 402. The radials 404 may be spaced apart from the representation 402 by a distance. In embodiments, the distance the representation between the representation 402 and the radials 404 may indicate a distance from the aircraft 100. The distance may be based on one or more settings of the radar system 150. The radials 404 may extend out to a maximum distance. In some instances, the radials 404 may represent a distance in nautical miles (NM). In embodiments, the radials 404 may extend for a range of up to 320 NM or more. For the example depicted, the graphical overlay 400 includes three of the radials 404, although this is not intended to be limiting.

The graphical overlay 400 may also include the representation 406 of the weather cells. The representation 406 of the weather cells may represent one or more weather cells disposed in front of the aircraft 100. The weather cells 402 may also be referred to as weather conditions. A position of the representation 406 of the weather cells relative to the representation 402 of the aircraft 100 on the graphical overlay 400 may indicate a position of the one or more weather cells relative to the aircraft 100. The representation 406 may thus be advantageous to determine how close the weather cells are to the aircraft 100. In some instances, the representation 406 may be referred to as a weather radar echo. In embodiments, the representation 406 may include one or more echoes. The echoes may indicate a reflectivity of the weather cells. The reflectivity may be measured in decibels relative to z (dBz). The representation 406 of the weather cell may be colored based on the reflectivity values. The representation 406 may color the echoes with a gradient according to the value of the reflectivity. For example, echoes with a reflectivity below a first threshold may be represented as a green echo, echoes with a reflectivity between the first threshold and a second threshold may be represented as a yellow echo, and echoes with a reflectivity above the second threshold may be represented as a red echo. The representation 406 may include a green echo 408a and a yellow echo 408b in the example depicted.

The graphical overlay 400 may also include a control panel including one or more controls. The control panel may graphically represent one or more control settings of the radar system 150. In this regard, the weather data 312 may include the current values for the control settings. The viewable settings from the ground station may include, but are not limited to, range setting 410, gain setting 412, mode setting 414, scan angle setting 416, tilt setting 418, GCS setting 420 (ground clutter suppression setting), alert setting 422, auto/manual setting 424, and the like. The range setting 410 may indicate the maximum range of the radials 404. The range setting 410 may also be referred to as an antenna coverage range in the flight path. The gain setting 412 may indicate the sensitivity of the radar system 150. The mode setting 414 may include one or more modes for the radar system 150. The modes may include, but are not limited to, weather mode (WX), turbulence mode (TURB), weather and turbulence mode (WX+T), map mode (MAP), and the like. Adjusting the mode setting 414 may change the colors of the echoes 408. For example, the colors of the echoes 408 may indicate the following: precipitation in WX, turbulence areas in TURB, precipitation and turbulence areas in WX+T, ground in MAP, although this is not intended to be limiting. The scan angle setting 416 may indicate a scan angle of the radar system 150. The scan angle may also be referred to as an antenna coverage value range. The tilt setting 418 may indicate a tilt angle of the radar system 150. The GCS setting 420 may automatically filter out ground clutter when turned on. The alert setting 422 may provide an automatic alert upon detecting a hazardous weather condition. For example, the alert setting 422 may include, but is not limited to, a windshear alert, turbulence alert, and the like. The auto/manual setting 424 may automatically adjust one or more of the range setting 410, the gain setting 412, the mode setting 414, the tilt setting 418, and/or the GCS setting 420 when set to auto. The various settings may be automatically adjusted based on avionics data. The avionics data used to adjust the various settings may include, but is not limited to, altitude, temperature, global position, time, phase-of-flight, and the like. The ability to graphically represent the control settings of the radar system 150 at the ground station 220 may be advantageous to allow the ATC to determine the control settings of the radar system 150 should be adjusted and provide an indication to the flight crew of the aircraft 100 to update the control settings. For example, the control settings may be currently set to manual with a configuration or mode that does not indicate a desired weather condition. For instance, the mode may be in a map mode. The ground station 220 may graphically display the control settings to the ATC by the graphical overlay 400. The ATC may determine the control settings are incorrect for the current flight conditions. For instance, the ATC may determine the control settings should be in a weather mode. The ATC may verbally communicate to the flight crew to adjust the control setting to display the desired weather condition by way of the air-to-ground communication.

In some instances, the weather data 312 may also include data for one or more range bins. Each range bin may include a reflectivity value. The reflectivity value may be determined based on the various control settings of the radar system 150, such as, but not limited to, the range setting, the scan angle setting, and the like. Each range bin may also include a position. The reflectivity values and the position for each of the range bins may then be used to generate the radar echoes 408, the weather cells 406, and/or the radials 404. The number of the range bins may indicate a resolution of the radar echoes 408 (e.g., echoes 408a, echoes 408b). The range bins may also be referred to as range gates.

It is contemplated that the air traffic controller (ATC) at the ground station 220 may use the graphical overlay 400 to adjust a flight plan of the aircraft 100 to avoid the weather cell. The ATC may achieve an improved level of situational awareness regarding the weather cells in front of the aircraft and/or regarding the weather radar overlay of the display 104. The ATC may also achieve an improved level of situational awareness when an aircraft is transitioning to the sector controlled by the ground station 220. The ATC may then approve deviations from the flight plan using the improved situational awareness.

It is contemplated that generating the graphical overlay 400 on the display 308 may be particular advantageous for aircraft which are operating by in single pilot operation (SPO). Demand for Single Pilot Operation (SPO) is increasing due to new pilot shortfalls; hence the workload of the pilot should be reduced. Single pilot operations may provide significant increases in workload compared to two-crew operations. For example, subjective assessments of safety and performance being significantly degraded as well. Periodic support from the ATC may be necessary during the single pilot operations. Thus, the ATC may provide support regarding the weather in the flight path of the aircraft 100, thereby alleviating workload from the pilot. As a result, the ATC can handle multiple flights to provide the required assistance regarding the weather conditions without burdening the pilot with providing PIREPs.

It is contemplated that the graphical overlay 400 may be particularly advantageous where the ground weather data 316 is not available. For example, the graphical overlay 400 may be advantageous for transatlantic flights which are outside the coverage range of NEXRAD.

In some embodiments, changing the various control settings (e.g., mode setting 414) may result in a new graphical overlay. In some embodiments, the processors 304 may generate the graphical overlay for each of the modes. For example, the processors 304 may generate the graphical overlay for each of the modes in parallel. In this regard, the ground station 220 may generate multiple graphical overlays for each aircraft 100. Generating multiple of the graphical overlays may then enable the ground station 220 to rapidly change the display 104 between the modes. The ground station 220 may also display each of the graphical overlays simultaneously. For example, the ground station 220 may display each of the graphical overlays simultaneously in a split-screen or similar configuration.

Referring now to FIGS. 5A-5D, a coverage map 500 of the display 308 is depicted, in accordance with one or more embodiments of the present disclosure. In embodiments, the display 308 of the ground station 220 may generate the coverage map 500. The coverage map 500 may be considered a coverage map of an airspace 501. The coverage map may be a top-down view of the airspace. The coverage map 500 may also be considered an aircraft tracking map, an ADS-B coverage map, an ADS-B airspace map, and the like. The coverage map may be generated based on one or more sources of data, such as, but not limited to, weather data 312, traffic data 314, ground weather data 316, ATC Radar data, flight plan information (e.g., from Air Navigation Service Providers), flight status data (e.g., from airlines, airports, etc.), and the like. The coverage map 500 may represent the selected airspace 501. The coverage map 500 may include various information to represent the selected airspace 501, such as, but not limited to, a representation 502 of the aircraft 100, landmarks 504, airports 506, weather cells 508, the graphical overlay 400, and the like.

The coverage map 500 may include a representation 502 of the aircraft 100 in the selected airspace 501. The representation 502 of the aircraft 100 in the selected airspace 501 may be generated from the traffic data 314. In some instances, the representation 502 may indicate a type or size of the aircraft 100, although this is not intended to be limiting. The coverage map 500 may also include multiple or a plurality of the aircraft 100 in the selected airspace. For example, the coverage map 500 is depicted as including two aircraft, although this is not intended to be limiting.

The coverage map 500 may include landmarks 504 in the selected airspace 501. The landmarks 504 may include, but are not limited to, roads, highways, interstates, cities, rivers, lakes, oceans, coastline, and the like. In some instances, the ATC may utilize the landmarks 504 when communicating a visual flight rule (VFR) to the aircraft 100.

The coverage map 500 may include airports 506 in the selected airspace 501. The airports 506 may be labelled with an airport code. In the example depicted, two of the airports 506 are displayed in the graphical overlay (e.g., the Eastern Iowa Airport or code CID, Iowa City Municipal Airport or code IOW), although this is not intended to be limiting.

Figure 5A:
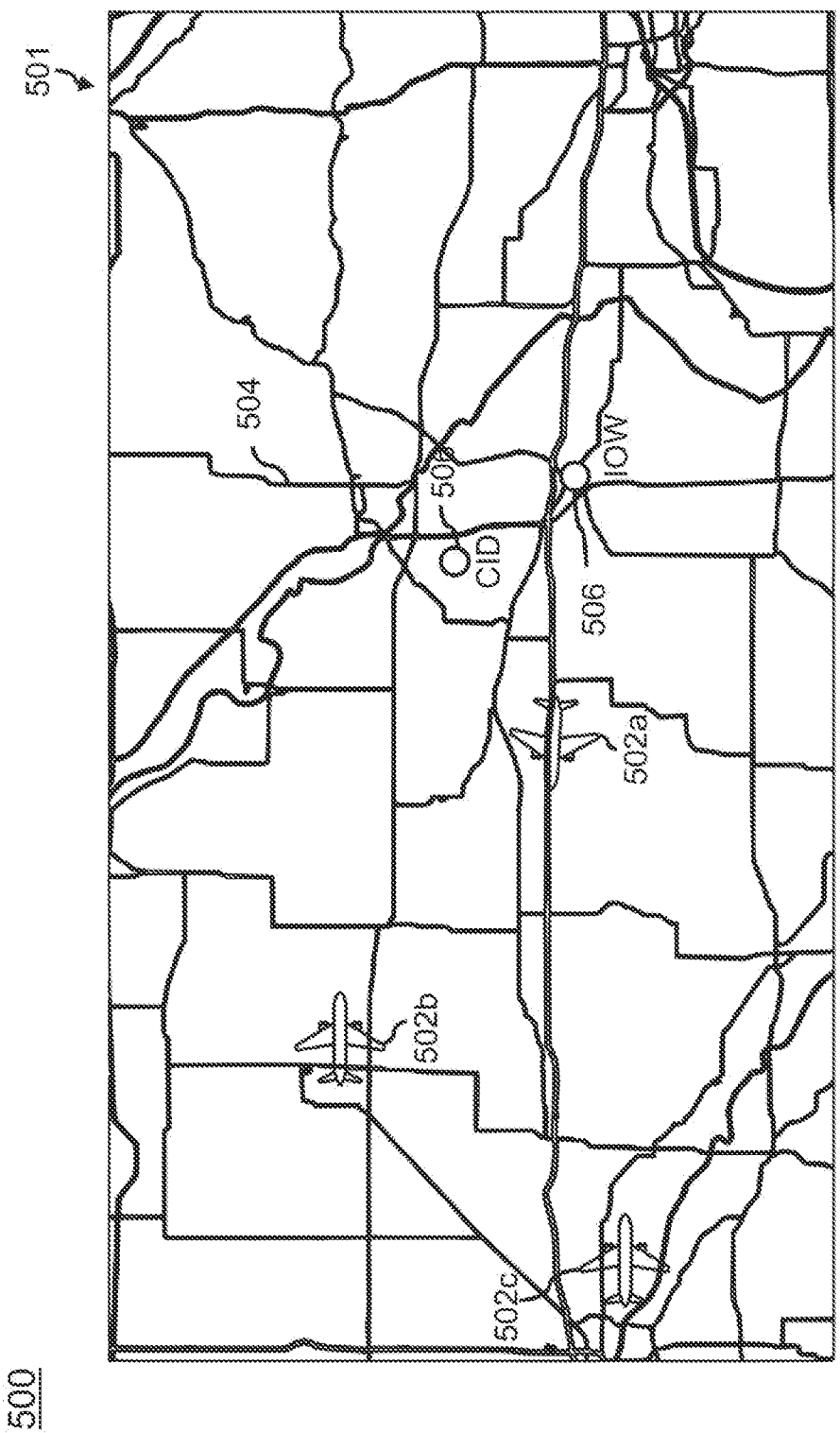
FIGS. 5A-5D depict a coverage map, in accordance with one or more embodiments of the present disclosure.
Figure 5B:
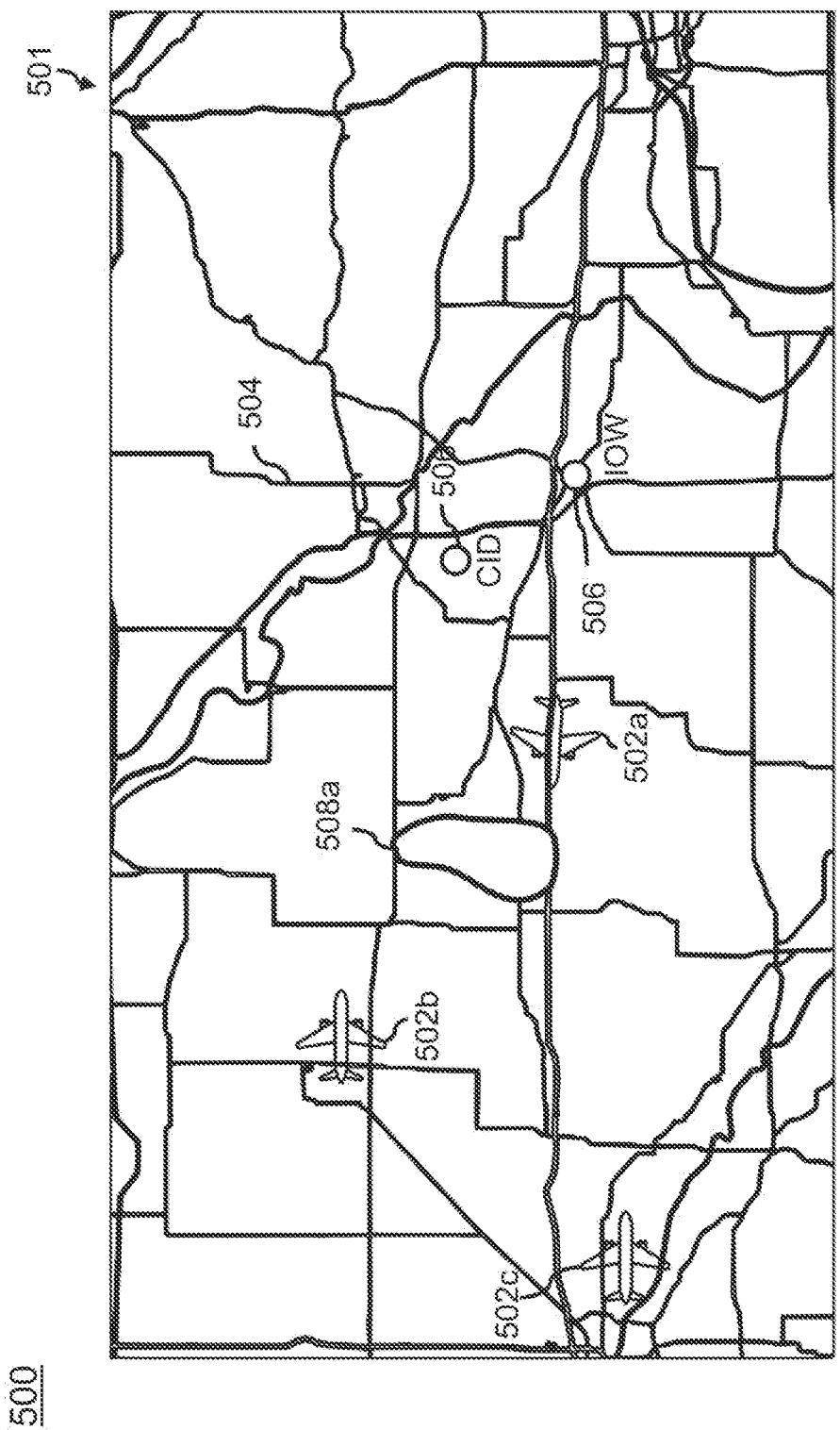

The coverage map 500 may include the weather cells 508. The weather cells 508 may be generated from the ground weather data 316. The weather cells 508 may be similar to the representation 406 of weather cells. In some instances, the weather cells 508 generated from the ground weather data 316 may be unrepresentative of the real-time weather conditions in the selected airspace 501. FIG. 5B depicts an example of the weather cell 508. In the contemplated example, the selected airspace 501 may include a region which should include the yellow radar echoes 408b. However, the weather cell 508a in FIG. 5B does not depict yellow radar echoes due to the recent development of the weather cell. The ground weather data 316 may be delayed such that the weather cell 508a does not depict the yellow radar echoes.

Figure 5C:
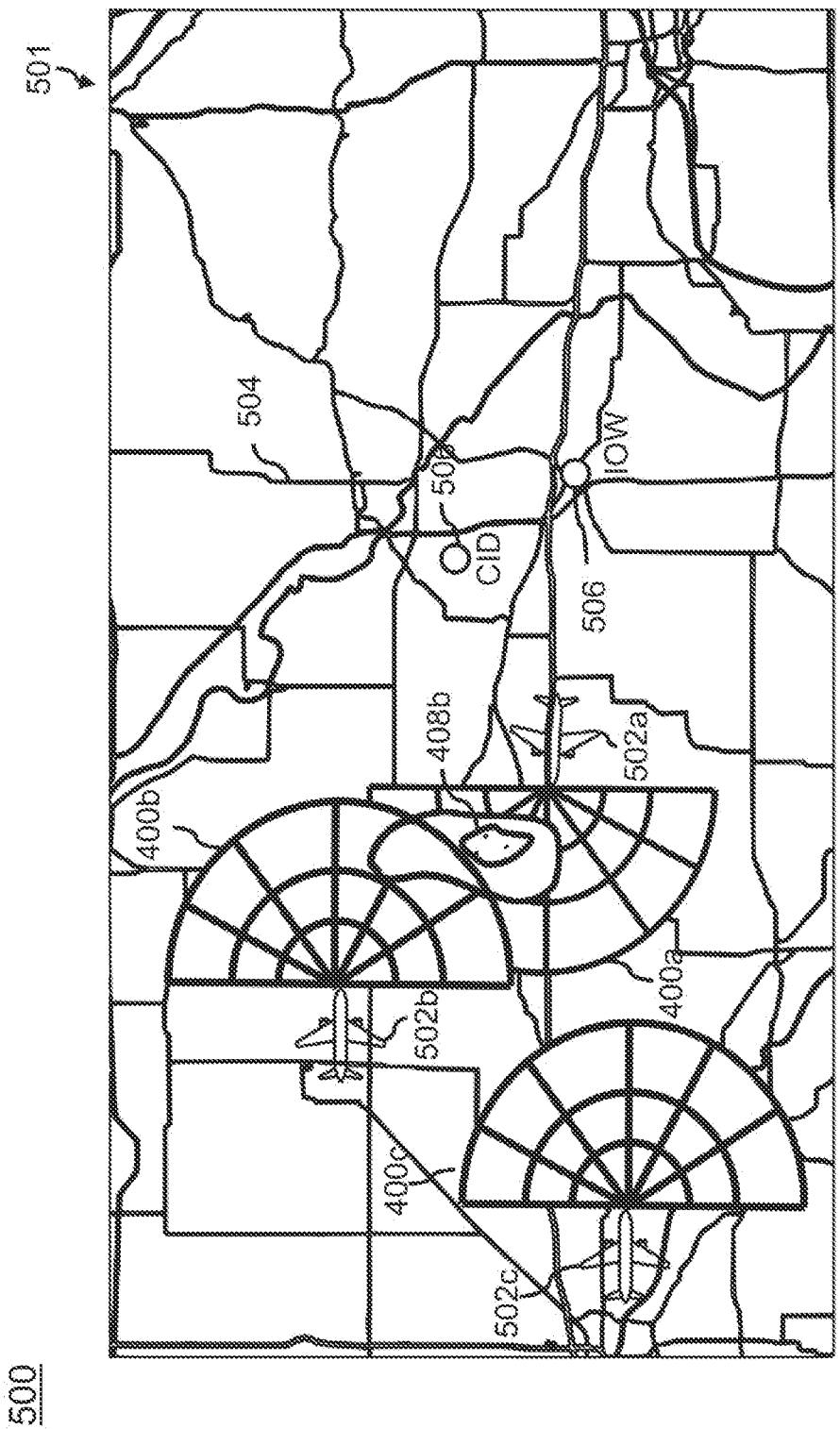

In embodiments, the coverage map 500 may include the graphical overlay 400 for the aircraft 100 in the selected airspace 501. The graphical overlay 400 may be placed in the flight path of the aircraft 100. In this regard, the graphical overlay 400 may be considered in a fixed position relative to the aircraft 100. The graphical overlay 400 may also be updated with the weather data 312 and the traffic data 314 to provide a real-time display of the position of the aircraft 100 and the weather data generated by the aircraft. FIG. 5C depicts an example of a graphical overlay 400a for an aircraft 502a, a graphical overlay 400a for an aircraft 502b, and a graphical overlay 400c for an aircraft 502c. In the contemplated example, the selected airspace 501 may include a region which includes the yellow radar echoes 408b. The real-time nature of the weather data 312 may enable the ground station 220 to generate the coverage map 500 with the real-time weather information. The ATC may then achieve a higher level of situational awareness than what is capable using the ground weather data 316.

In embodiments, the coverage map 500 may include the graphical overlay 400 for each of the aircraft 100 in the selected airspace. The ground station 220 may be configured to request the weather data 312 from each of the aircraft 100 in the airspace 501 by way of the communication system 302. The ground station 220 may receive the weather data 312 and generate the graphical overlays 400. In this regard, the coverage map 500 may include multiple of the graphical overlays 400. In some instances, the graphical overlays 400 may at least partially overlap. For example, the graphical overlays 400 may be cone shaped and extend from the nose of the aircraft 100. The graphical overlays 400 may at least partially overlap based on the distance between the aircraft and the range of the weather data 312. The graphical overlays 400 may then provide a composite image of the weather cells. In embodiments, the graphical overlays 400 may be placed in a layer above the weather cells 508 generated from the ground weather data 316.

In embodiments, the ground station 220 is configured to receive an input 512 from the user interface 310. The input 512 may be a selection of the aircraft 100 on the coverage map 500. For example, the input 512 may include, but is not limited to, clicking on the representation 502 of the aircraft on the coverage map 500. In embodiments, the ground station 220 may be configured to generate the graphical overlay 400 based on the weather data 312 in response to receiving the input 512 on the coverage map 500. The graphical overlay 400 may be generated on the coverage map 500 in response to the input 512. The ATC may then have an option to view the weather radar overlay of the aircraft 100. In embodiments, the ground station 220 may request the weather data 312 from the aircraft 100 in response to the input 512. Requesting the weather data 312 from the aircraft 100 in response to the input 512 may be advantageous to conserve SATCOM resources.

Although not depicted, the coverage map 500 may include a flight path of the aircraft 100. The flight path may be generated based on the traffic data 314. The flight path may enable the ATC to suggest an alternate course or deviation to avoid a weather condition in the airspace 501.

Figure 5D:
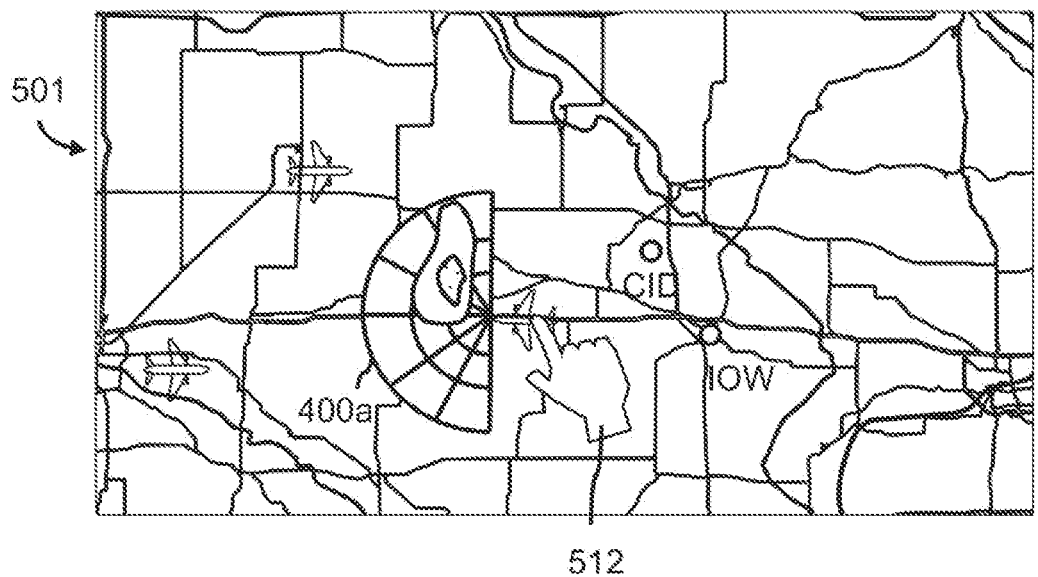
Figure 5D:
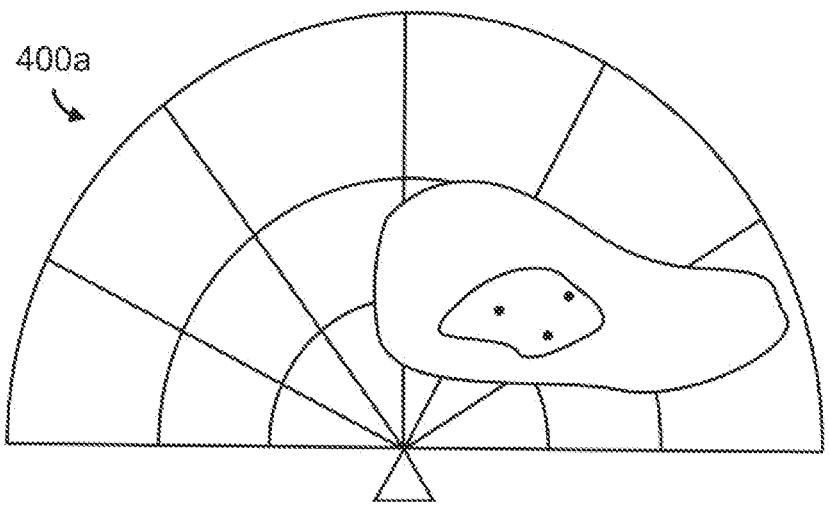

In embodiments, the ground station 220 may include program instructions which cause the processors 304 to display the graphical overlay 400 in front of the graphical representation 502 of the aircraft 100 positioned in the selected airspace 501. For example, FIG. 5C and FIG. 5D depict the graphical overlay 400a in front of the graphical representation 502a. In embodiments, the ground station 220 may include program instructions which cause the processors 304 to display the graphical overlay 400 adjacent to the coverage map on the display 308. Adjacent to may refer to above, below, or to a side. For example, FIG. 5D depicts the graphical overlay 400a below the coverage map of the selected airspace 501.

Figure 6A:
FIG. 6A depicts a prediction module of a ground station, in accordance with one or more embodiments of the present disclosure.
Figure 6B:
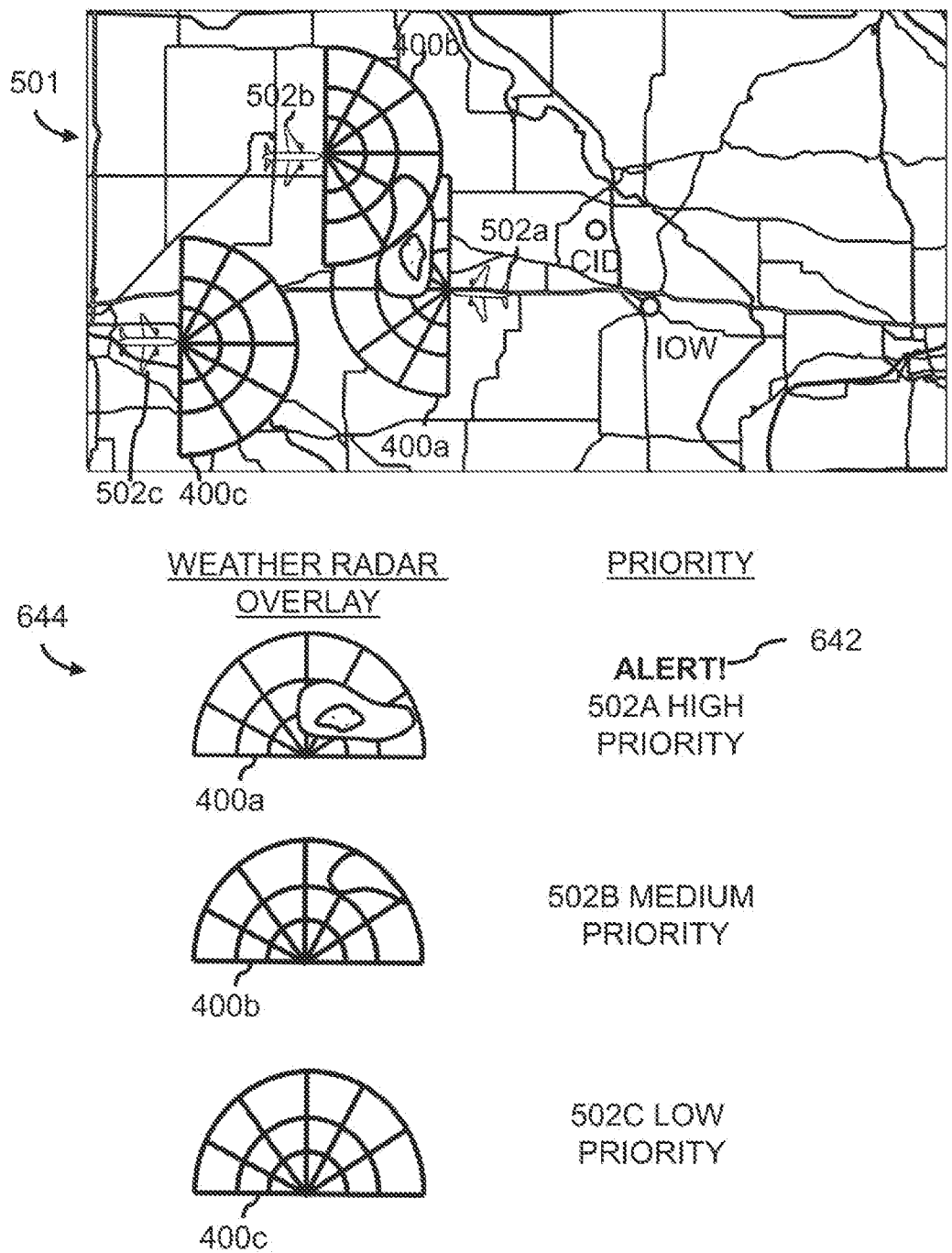
FIG. 6B depicts a list of aircraft in a selected airspace with priority information generated by a prediction module, in accordance with one or more embodiments of the present disclosure.

Referring now to FIGS. 6A-6B, the prediction module 320 is described, in accordance with one or more embodiments of the present disclosure. The prediction module 320 may cause the processors 304 to identify aircraft which are near hazardous weather conditions (e.g., aircraft which may require attention in the near term). The prediction module 320 may be employed on the received weather data from multiple aircraft. The prediction module 320 may help the air traffic controller (ATC) to prioritize the aircraft that require attention. The prediction module 320 may cause the processors 304 to generate a list of the aircraft in the selected airspace 501.

In a step 610, the processors 304 may determine the position of each of the aircraft based on the traffic data 314. The processors 304 may also determine the position of one or more weather cells based on the weather data 312. The processors 304 may also determine the distance between the weather cells and the aircraft based on the position of one or more weather cells and the position of the aircraft.

In a step 620, the processors 304 may determine which of the weather cells are in the flight path of the aircraft 100. The processors 304 may determine the weather cells are in the flight path of the aircraft based on the position of the weather cells and the known flight path of the aircraft 100. In some embodiments, the processors 304 machine learning (ML) and/or a neural network to carry out any or all of the operations disclosed throughout, as would be understood by one of ordinary skill in the art of using ML and neural networks.

In a step 630, the processors 304 may determine priority information based on the weather cells. The priority information may be determined based on a distance between the weather cells and the aircraft. In some embodiments, the priority information may determine the distance information for the weather cells that are in the flight path of the aircraft. In this regard, the aircraft may be adjacent to a weather cell but may not fly into the weather cell. In some embodiments, the priority information may also be generated based on a severity of the weather cell. For example, the weather cell may include one or more severe conditions for which a SIGMET may be issued, such as, but not limited to, severe icing, severe turbulence, dust storms, volcanic ash, tornadoes, hail, and the like. The severe conditions may receive a greater weight in determining the priority information than non-severe weather conditions (e.g., minor turbulence, rain, snow, and the like).

In a step 632, the processors 304 may determine the priority information based on a historical data maintained in the memory 306. For example, the memory 306 may maintain historical weather data 312, traffic data 314, ground weather data 316, and the like. The memory may store the weather data 312, traffic data 314, ground weather data 316, and the like upon receiving the data. A database of the historical data including the weather data 312, traffic data 314, ground weather data 316 may then be maintained. In some embodiments, one or more models may be applied to the historical data. The models may be applied to the historical data to determine the priority information. In some embodiments, the models may be trained on the historical data and may then be applied to current data to determine the priority information for the aircraft in the selected airspace. The model may be trained using one or more techniques, such as machine learning or a similar approach. The model may determine a weight to be given to the distance between the weather cells and the aircraft, the severity of the weather cell, and the like.

In a step 640, the processors 304 may provide an alert on the display 308. The processors 304 may use the priority information when generating the coverage map 500 on the display 308. The alert may indicate when the aircraft 100 is headed towards the weather cell. In embodiments, the one or more processors 304 are configured to provide an alert on the display 308. The alert may include a visual alert 642, a list 644, an aural alert 646, and the like. Hence, the display 308 may provide predictive weather alerts to be provided to the ATC so that appropriate assistance can be provided to a given aircraft in the airspace based on the severity of weather conditions. For example, the program instructions may cause the processors 304 to provide the list with the priority information on the display 308.

In some embodiments, the alert may include the visual alert 642. The visual alert 642 may display information on the display 308 to present the alert to the ATC at the ground station 220. The visual alert may include, but is not limited to, lights, a flashing icon, a textual alert, a colored alert, and the like.

In some embodiments, the alert may include the list 644. The coverage map 500b may include the list 644 of all of the aircraft in the selected airspace 501. The program instructions may cause the processors 304 to provide the list 644 with the priority information on the display 308. For example, the list 644 may list of the aircraft alphanumerical by ID with the priority listed adjacent to the aircraft ID. By way of another example, the list 644 may be sorted based on the priority information. The ATC may then visually determine which aircraft are in need of the most immediate attention. In some embodiments, the list 644 may be grouped into one or more categories. The categories may include, but are not limited to, high priority, medium priority, low priority, and the like. FIG. 6B depicts one example of the list 644 for the selected airspace 501. The representation 502a is listed as a high priority due to the proximity to the radar echoes 408b. The representation 502b is listed as a medium priority. The representation 502c is listed as a low priority.

In some embodiments, the alert may include the aural alert 646. The aural alert 646 may include discrete sounds, tones, or verbal statements used to annunciate an alert. Providing the aural alerts to the ATC by the display 308 may be advantageous to allow the ATC to focus on other priority tasks during normal weather conditions and immediately react upon hearing the aural alert 646 during hazardous weather conditions.

In some embodiments, the alert may be based on the priority information determined using the prediction module 320. The modality of the alert may be adjusted according to the priority of the alert. The priority information may include the categories of high priority, medium priority, and low priority. The modality of the alert may be highest for the high priority, a middle modality for the medium priority, and lowest for the low priority. For example, the high priority may include a red-colored alert, the medium priority may include a yellow-colored alert, and the low priority may include a green colored alert. By way of another example, the intensity of the aural alert may be increased based on the priority.

Referring now to FIG. 7, the request module 322 is described, in accordance with one or more embodiments of the present disclosure. The request module 322 may cause the processors 304 to cause the communication system 302 to request the weather data 312 from the aircraft 100.

In some embodiments, the processors 304 may cause the communication system 302 to request 710 the weather data 312 from each of the aircraft 100 in the selected airspace 501. The coverage map 500 may then indicates the weather data 312 from each of the aircraft in the selected airspace 501. The coverage map 500 may indicate the weather data from each of the aircraft by including the graphical overlay 400 for each of the aircraft. However, requesting the weather data 312 from all of the aircraft 100 may require significant satellite time when the air-to-ground communication channel is by way of the satellite 226.

In embodiments, the processors 304 may cause the communication system 302 to request 720 the weather data 312 from the aircraft 100 in response receiving a selection of the aircraft 100 by the user interface 310. The selection may include the input 512 selecting the one or more aircraft 100 on the coverage map 500. The ATC may select the aircraft in the coverage map by interacting with a user interface. For example, the ATC may select the aircraft in the coverage map using a cursor. In this regard, the real-time weather information may be transmitted in response to selecting the aircraft. Transmitting the real-time weather information in response to selecting the aircraft may be advantageous for reducing a satellite time used to communicate the real-time weather information.

In some embodiments, the processors 304 may cause the communication system 302 to request 730 the weather data 312 in response to determine a weather cell is disposed in a flight path of the aircraft 100. For example, the processors 304 receive the ground weather data 316 and determine a weather cell is disposed in a flight path of the aircraft 100 in the coverage map 501 based on the ground weather data 316. The communication system 302 may request the weather data 312 from the aircraft 100 in response to the processors 304 determining the weather cell is disposed in the flight path.

In some embodiments, the processors 304 may cause the communication system 302 to request 740 the weather data 312 from the aircraft 100 based on the priority information (e.g., as determined in the step 630). For example, the communication system 302 may automatically request the weather data 312 from the aircraft 100 when the priority exceeds a threshold. The threshold may include, but is not limited to, when a distance between the aircraft and a weather condition in the flight path is below a given range. As may be understood, the specific range is not intended to be limiting and may be configurable based on a safety tolerance of the ground station 220. In some embodiments, the priority information may be determined based on the ground weather data 316.

The request 710, request 730, and/or request 740 the weather data 312 from the aircraft 100 may be advantageous to save the ATC at the ground station 220 time when providing instructions to aircraft 100 which are near to hazardous weather conditions, as compared to having to select the aircraft in the request 720.

The request 710, request 720 and/or request 740 the weather data 312 from the aircraft 100 may be advantageous in saving satellite time, as compared to the request 710 from all aircraft 100 in the coverage map. The ground station 220 may then use the weather data 312 (e.g., real-time weather data) to verify that the ground weather data 316 is accurate and/or that the weather cell is actually disposed in the flight path of the aircraft 100. The ability to request the real-time weather information in response to detecting the weather condition in the flight path may be advantageous for providing a backup or more accurate source of data. In this regard, the weather condition may rapidly change. The real-time weather information may indicate the weather condition has abated or is no longer in the flight path such that the ATC does not need to change the flight path.

In some embodiments, the request module 322 may also cause the communication system 302 to transmit a request 750 to the aircraft 100. The request 750 may be transmitted to the aircraft by the air-to-ground communication channel. The request 750 may cause the flight display 104 of the aircraft to generate a weather alert. The aircraft 100 may receive the weather alert and generate the weather alert on the display. The weather alert may indicate a weather condition is disposed in the flight path of the aircraft.

Referring generally again to FIGS. 1A-7. In embodiments, the ground station 220 may share the weather data 312 between multiple of the aircraft 100. For example, the ground station 220 may share the weather data 312 between all of the aircraft which are located in a region. In embodiments, the ground station 220 may detect the flight path of the aircraft is through the region of an aircraft which is currently generating or has previously generated weather data for that area. The ground station 220 may share the weather data for the region in response to detecting the flight path of the aircraft is through the region. Thus, the ground station 220 may share the situational awareness between the aircraft.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A ground station comprising:
 a communication system configured to receive weather data and traffic data from an aircraft, wherein the aircraft comprises a flight display and a radar system, wherein the radar system is configured to generate the weather data, wherein the flight display is configured to generate a weather radar overlay based on the weather data;

a display;
a memory maintaining program instructions; and
one or more processors configured to execute the program instructions causing the one or more processors to:
receive the weather data and the traffic data; and
cause the display to generate a graphical overlay based on the weather data, wherein the graphical overlay mirrors the weather radar overlay of the flight display in real-time, wherein the graphical overlay comprises a representation of the aircraft in a fixed position, a plurality of radials projecting away from the representation of the aircraft, and a representation of one or more weather cells, wherein a position of the representation of the one or more weather cells relative to the representation of the aircraft indicates a position of the one or more weather cells relative to the aircraft.

2. The ground station of claim 1, wherein the weather data comprises ARINC 708A data.

3. The ground station of claim 2, wherein the weather data comprises a reflectivity value for a plurality of range bins and control settings comprising a range setting, a gain setting, a scan angle setting, and a tilt setting for the radar system, wherein the graphical overlay displays the control settings, wherein the one or more processors are configured to change the control settings and generate a new graphical overlay.

4. The ground station of claim 3, wherein the control settings comprise a mode setting, wherein the mode setting comprises modes including a weather mode, a turbulence mode, a weather and turbulence mode, and a map mode, wherein the one or more processors are configured to generate graphical overlays for each of the modes.

5. The ground station of claim 4, wherein the ground station is configured to change between displaying the graphical overlays for each of the modes.

6. The ground station of claim 4, wherein the ground station is configured to display the graphical overlays for each of the modes simultaneously.

7. The ground station of claim 1, wherein the communication system is configured to receive the weather data and the traffic data from the aircraft via an air-to-ground communication channel, wherein the air-to-ground communication channel comprises one of a satellite communication link, a very-high frequency link, or a high frequency link.

8. The ground station of claim 1, wherein the program instructions cause the display to generate a coverage map, wherein the coverage map represents a selected airspace, wherein the coverage map includes a graphical representation of the aircraft positioned in the selected airspace based on the traffic data.

9. The ground station of claim 8, further comprising a user input device, wherein the program instructions cause the one or more processors to:
receive an input from the user input device, the input including a selection of the aircraft on the coverage map; wherein the one or more processors cause the display to generate the graphical overlay based on the weather data in response to receiving the input.

10. The ground station of claim 9, wherein the program instructions cause the one or more processors to cause the communication system to request the weather data from the aircraft in response to receiving the input.

11. The ground station of claim 8, wherein a plurality of aircraft are disposed in the selected airspace, wherein the program instructions cause the one or more processors to cause the communication system to request weather data from each of plurality of aircraft in the selected airspace, wherein the coverage map indicates the weather data from each of the aircraft in the selected airspace.

12. The ground station of claim 11, wherein the program instructions cause the one or more processors to:
generate a list of the plurality of aircraft in the selected airspace;
determine priority information based on the one or more weather cells, the priority information determined based on a distance between the one or more weather cells and the plurality of aircraft; and
provide the list with the priority information on the display.

13. The ground station of claim 8, wherein the program instructions cause the one or more processors to display the graphical overlay in front of the graphical representation of the aircraft positioned in the selected airspace.

14. The ground station of claim 8, wherein the program instructions cause the one or more processors to display the graphical overlay adjacent to the coverage map on the display.

15. The ground station of claim 8, wherein the communication system is configured to receive ground weather data, wherein the program instructions cause the one or more processors to display one or more weather cells on the coverage map based on the ground weather data, wherein the graphical overlay is placed in a layer above the one or more weather cells generated based on the ground weather data.

16. The ground station of claim 15, wherein the ground weather data comprises at least one of AIRMET, SIGMET, METAR, or NEXRAD.

17. The ground station of claim 1, wherein the communication system is configured to receive ground weather data, wherein the program instructions cause the one or more processors to determine a weather cell is disposed in a flight path of the aircraft based on the ground weather data and request the weather data from the aircraft in response to determining the weather cell is disposed in the flight path.

18. A system comprising:
an aircraft comprising:
a radar system, wherein the radar system is configured to generate weather data; and
a flight display, wherein the flight display is configured to generate a weather radar overlay based on the weather data; and
a ground station comprising:
a communication system configured to receive the weather data and traffic data from the aircraft;
a display;
a memory maintaining program instructions; and
one or more processors configured to execute the program instructions causing the one or more processors to:
receive the weather data and the traffic data; and
cause the display to generate a graphical overlay based on the weather data, wherein the graphical overlay mirrors the weather radar overlay of the flight display in real-time, wherein the graphical overlay comprises a representation of the aircraft in a fixed position, a plurality of radials projecting away from the representation of the aircraft, and a representation of one or more weather cells, wherein a position of the representation of the one or more weather cells relative to the representation of the aircraft indicates a position of the one or more weather cells relative to the aircraft.

\* \* \* \* \*